Figure 1:
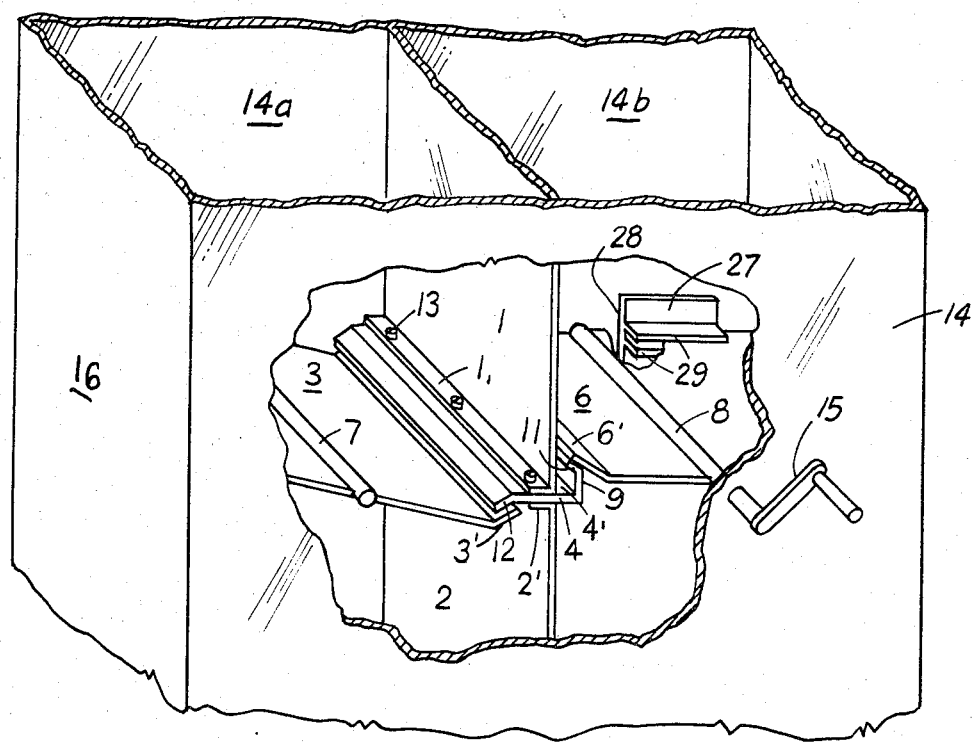

April 9, 1968

F. J. SIZEK 3,376,891

DAMPER SEAL ARRANGEMENT

Filed Feb. 16, 1966

INVENTOR.
Frank J. Sizek

United States Patent Office 3,376,891
Patented Apr. 9, 1968

3,376,891
DAMPER SEAL ARRANGEMENT
Frank J. Sizek, Rock Island, Ill., assignor to American Air Filter Company, Inc., Louisville, Ky., a corporation of Delaware
Filed Feb. 16, 1966, Ser. No. 527,913
4 Claims. (Cl. 137—594)

The present invention relates to damper seal arrangements for fluid dampers and more particularly relates to damper seal arrangements to provide damper sealing surfaces in adjacent fluid-conducting compartments separated by a common partition.

In previous fluid handling equipment where a fluid, usually air, is conducted through adjacent conduits separated by a common partition, and each conduit includes a damper for regulating the flow of air, it has been necessary to provide separate sealing surfaces in each conduit for each damper. In such previous equipment the separate seals have been individually fastened to each side of the common partition within each section of the separated conduits so that separate fastening operations and materials are required for each seal.

In accordance with the present invention, a novel damper sealing arrangement is provided where the seal member is easily installed, only one unitized member is required to provide sealing surfaces for dampers in adjacent fluid conduits separated by a common partition, and both material and labor requirements are reduced. Furthermore, the economical sealing arrangement of the present invention can be made an integral part of the partition which separates the dampers, and can easily be installed before or during final assembly of the conduit.

Various other features of the present invention will become obvious to one skilled in the art upon reading the disclosure set forth hereinafter.

More particularly, the present damper arrangement provides a multizone damper seal arrangement comprising; a first fluid flow zone including damper means rotatably mounted on a first damper axis to regulate fluid flow through the first zone; a second zone adjacent the first zone including a second damper rotatably mounted on a second damper axis which is generally parallel the first damper axis where the second damper regulates fluid flow through the second zone; a common partition separating the first and second zones, the partition having an aperture extending in a direction generally parallel the first and second damper axis; and a sealing member including a base section cooperatively nested in the aperture, the sealing member further including a first damper sealing surface joined to the base section and extending into the first zone so said sealing surface is cooperatively engaged by the first damper in sealing relation when the damper is rotated to selected position and a second sealing surface joined to the opposite side of the base section and extending into the second zone to cooperatively engage the second damper in sealing relation when the second damper is rotated to a selected position.

It is to be understood that various modifications can be made in the arrangement, form and construction of the damper seal arrangement disclosed herein without departing from the scope or spirit of the present invention.

Figure 2:
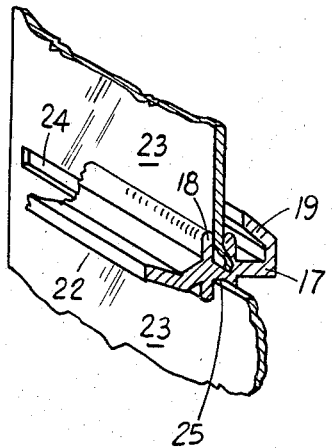

FIGURE 1 is an isometric view partly in section of a portion of a conduit including a damper seal arrangement in accordance with the present invention; and FIGURE 2 is an isometric view of a fragmentary section of another example of a damper seal arrangement in accordance with the present invention.

The damper seal arrangement in accordance with the present invention can be used in any number of adjacent fluid conduit zones, and the example of FIGURE 1 shows a conduit 14 which includes two zones 14a and 14b separated by a common partition including panel members 1 and 2. In accordance with the present invention, sealing member 4, which extends through a cooperative opening between wall members 1 and 2, provides sealing surfaces for dampers 3 and 6 in conduits 14a and 14b, respectively.

In accordance with the present invention, a single seal 4 which can be made of any suitable flexible material, for example, rubber, is provided and includes a base section 4' and sealing surfaces 11 and 12, advantageously disposed in adjacent separated air ducts 14a and 14b. Base section 4' of seal 4 extends through the opening between panel members 1 and 2 of the partition dividing conduit 14 into two smaller conduits 14a and 14b. Sealing edges 11 and 12, of base member 4', are cooperatively disposed relative to base member 4' to meet edges 3' and 6' of dampers 3 and 6, respectively, in sealing relation when the dampers are rotated to selected position. Within the scope of the present invention seal member 4 can be contoured to dispose sealing edges 11 and 12 in any one of several selected positions, and advantageously, in the example of FIGURE 1, sealing member 4 includes a lateral portion 9 which holds sealing edge 11 away from base 4' and at a desired angle in conduit 14b to form sealing relation with edge 6' of damper 6. Sealing edge 12 extends from base member 4' and is disposed in cooperative angular relation in conduit 14a to engage sealing edge 3' of damper 3 as damper 3 is rotated to a selected position.

Dampers 3 and 6 can be rotated on axes 7 and 8, respectively, by any desired external means such as crank 15 joined to damper shaft 8 to rotate damper 6.

Any suitable means can be provided to hold sealing member 4 in a desired position in the aperture in the common partition between conduits 14a and 14b, and FIGURE 1 shows an arrangement where each of panels 1 and 2 includes a flange 1' and 2', respectively, so sealing member 4 is held in clamped relation between the flanges. Flanges 1' and 2' advantageously include apertures for clamping bolts 13 which can be drawn up to hold sealing element 4 between flanges 1' and 2' in desired position. In the example of the present invention shown in FIGURE 1, the damper sealing member 4 can be installed during the installation of partitions 1 and 2, or partitions 1 and 2 can be installed in duct 14 and sealing member 4 can be inserted in the opening between flanges 1' and 2' after installation of panels 1 and 2.

The damper sealing arrangement of the present invention can advantageously be used in the common partitions separating any number af adjacent fluid conduits. Any suitable seal means (not shown) can be cooperatively affixed to outside panels 16 to provide sealing means for the opposite edges of each of the dampers. Furthermore, side seals can be provided between the sides of dampers 3 and 6 and the side walls of conduits 14a and 14b.

In the example of FIGURE 1 a side seal 27 is mounted on the side edge of damper 6. Side seal 27 includes a pair of cooperatively disposed gripping edges 29 forming a groove therebetween to engage and grip the side edge of damper 6 and a laterally xtending member 28 integral with gripping elgs 29 to contact the walls of conduit 14b in sealing relation to prevent passage of fluid between damper 6 and the side walls of conduit 14b. Side seals 27 can be of any suitable material, such as rubber or plastic, and can be provided as desired for any number of dampers.

Other advantageous embodiments of the present invention can be envisioned and FIGURE 2 is another example of an alternative embodiment wherein a seal 17 is inserted through a cooperative slot 24 in a partition 23 which separates adjacent fluid conduits. Sealing member 17 of FIGURE 2 can be inserted through aperture 24 in panel 23 before or after installation, and the periphery of the slot in panel 23 nests in groove 25 of sealing member 17. Sealing ridges 18 are provided on each side of groove 25 of sealing member 17 to maintain the desired position of sealing member 17 relative to panel 23 and the dampers in the separate conduits, not shown. Sealing edges 19 and 22 are cooperatively disposed on sealing member 17 to engage dampers in sealing relation as hereinbefore described relative to sealing edges 11 and 12 of seal member 4 of FIGURE 1. Sealing member 17, like sealing member 4 of FIGURE 1, can be made of rubber or any suitable flexible material.

The invention claimed is:

1. A multizone seal arrangement comprising: a first zone through which fluid flows including damper means rotatable on a first axis to regulate fluid flow through said first zone; a second zone through which fluid flows disposed adjacent said first zone, said second zone including second damper means rotatably mounted about a second damper axis generally parallel to said first damper axis to regulate fluid flow through said second zone; a common partition separating said first zone and said second zone, said partition having an elongated aperture extending in a direction substantially parallel said damper axes; a sealing member including a base section coextensive with said aperture and cooperatively inserted in said aperture, a first damper sealing surface joined to said base section to extend into said first zone to be cooperatively engaged by said first damper in sealing relation when said damper is rotated to a selected position, and a second sealing surface joined to the opposite side of said base section to extend into said second zone to be cooperatively engaged by said second damper in sealing relation when said second damper is rotated to selected position.

2. The apparatus of claim 1 including means holding said base member in said common partition in sealing relationship with said aperture.

3. The apparatus of claim 2 wherein said partition includes cooperative peripheral flanges adjacent the edges of said aperture to hold said base member therebetween in clamped relation.

4. The apparatus of claim 3 wherein said base member includes spaced ridges on the upper and lower surfaces extending generally parallel the longitudinal axis of said base member to cooperatively receive the peripheral edges of said partition therebetween in nesting, sealing relation to hold said sealing member in desired position relative said common partition and said first and second dampers.

References Cited

UNITED STATES PATENTS

| 2,699,106 | 1/1955 | Hoyer | 137—609 XR |
| 2,974,680 | 3/1961 | Kreuttner | 137—601 XR |
| 3,283,694 | 11/1966 | Dean | 98—38 |

HENRY T. KLINKSIEK, *Primary Examiner.*